US005600721A

United States Patent [19]

Kitazato

[11] Patent Number: 5,600,721
[45] Date of Patent: Feb. 4, 1997

[54] APPARATUS FOR SCRAMBLING A DIGITAL VIDEO SIGNAL

[75] Inventor: Naohisa Kitazato, Kanagawa, Japan

[73] Assignee: Sony Corporation, Tokyo, Japan

[21] Appl. No.: 281,277

[22] Filed: Jul. 27, 1994

[30] Foreign Application Priority Data

Jul. 30, 1993 [JP] Japan .................................. 5-189510

[51] Int. Cl.$^6$ .................................................. H04N 7/167
[52] U.S. Cl. ................................ 380/20; 380/10; 380/14
[58] Field of Search .................................. 380/10, 20, 14

[56] References Cited

U.S. PATENT DOCUMENTS

| | | |
|---|---|---|
| 4,771,458 | 9/1988 | Citta et al. . |
| 5,173,900 | 12/1992 | Miller et al. . |
| 5,185,794 | 2/1993 | Thompson et al. ................ 380/15 X |
| 5,224,161 | 6/1993 | Daniel et al. . |
| 5,365,272 | 11/1994 | Siracusa ................................ 348/426 |

FOREIGN PATENT DOCUMENTS 0426923  5/1991  France .

OTHER PUBLICATIONS

Signal Processing Image Communication, vol. 4, No. 4/5, Aug. 1992, Amsterdam, NL pp. 421–428, XP293758 Michon et al. How to integrate access control mechanisms into HDTV systems.

*Primary Examiner*—Gilberto Barrón, Jr.
*Attorney, Agent, or Firm*—William S. Frommer; Alvin Sinderbrand

[57] ABSTRACT

Apparatus for intermittently or partially scrambling a digital video signal which encodes a digital video signal and successively supplies frames of video data corresponding to the encoded digital video signal. Each frame of video data has a respective frame number and respective blocks of video data, and each block of video data has a respective block number. Frame-scramble-off data is added to each frame which has a frame number equal to one of a plurality of predetermined frame numbers, and block-scramble-off data is added to each block which has a block number equal to one of a plurality of predetermined block numbers. A frame of video data is scrambled in the intermittent scrambling mode if it does not have the frame-scramble-off data and each block of video data is scrambled in the partial scramble mode if it does not have the block-scramble-off data. The scrambled frames or blocks of video data and the frames or blocks which are not scrambled are supplied as the scrambled digital video signal. The scrambled digital video signal is descrambled by receiving frames of video data of the scrambled signal, where each frame has either frame scramble-on data or frame scramble-off data, and respective blocks of video data, where each block has either block scramble-on data or block scramble-off data. Each block which has the block scramble-on data of those frames which have the frame scramble-on data are then descrambled to provide a descrambled digital video signal.

28 Claims, 5 Drawing Sheets

APPARATUS FOR SCRAMBLING A DIGITAL VIDEO SIGNAL

BACKGROUND OF THE INVENTION

The present invention relates to apparatus for scrambling digital video data and, more particularly, apparatus for intermittently scrambling or partially scrambling digital video data where in the intermittent mode each frame is or is not scrambled depending upon its frame number, and in the partial scramble mode each block of data in each frame is or is not scrambled or not scrambled depending upon its block number.

It is known that when an analog video signal representing a video image is transmitted, the video image formed by the information contained in the received video signal is of a lesser quality than the original video image. This usually is due to noise, reduction in the signal to noise ratio, etc. In order to solve this problem to improve the quality of the video signal that is received, it is known to convert the analog video signal to a digital video signal prior to transmission. The digital video signal usually is encoded in a predetermined format prior to transmission and then decoded back to its original non-encoded form.

Figure 1:
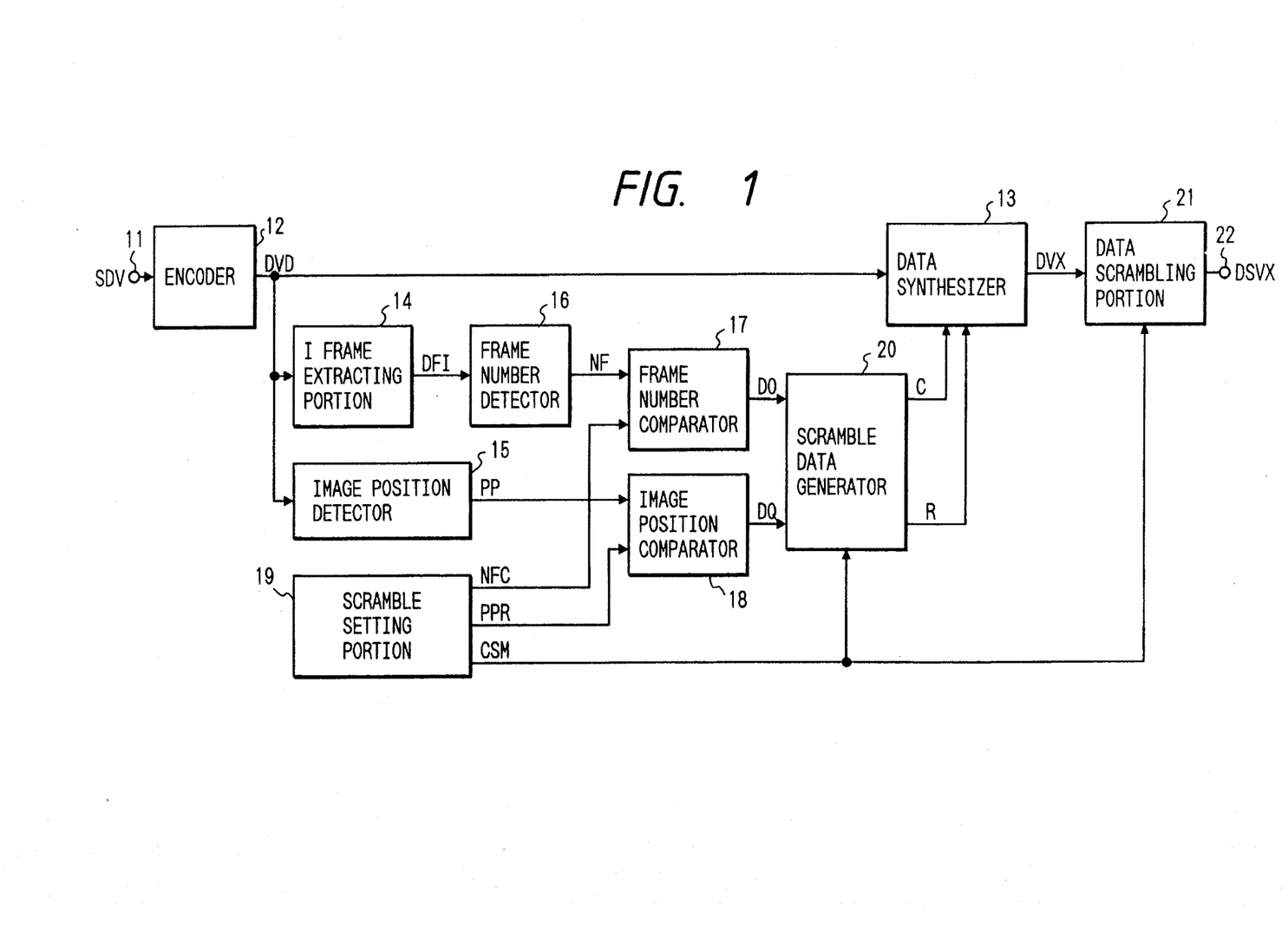
FIG. 1 is a schematic diagram showing the format of a known coded digital video signal.

One example of such a format is shown in FIG. 1. As shown, each video frame of video data of the encoded signal includes a frame header followed by blocks of video data, wherein each video data block includes a block header and block data. Image information provided in the original video signal is stored in the block data portion of each data block. Each frame header and block header includes information such as synchronizing data, frame number, line number of a frame, etc.

In addition to digitizing and encoding a video signal prior to transmission, the video signal may also be compressed in order to reduce the amount of data to be transmitted, which results in more efficient transmission of video signals. One method of compressing data is interframe coding wherein the difference between pixel values or block values of the current video frame and the preceding video frame is calculated to produce a resultant interframe-coded frame of video data. Data in other video frames (e.g., succeeding frames) may also be utilized to generate each interframe-coded frame.

When a video signal is interframe coded and then transmitted, the received signal must be decoded in conformity with the interframe coded format. That is, when decoding each interframe-coded frame, information from other frames must also be utilized and decoded in order to decode the successive, received frame. One problem that exists when transmitting interframe-coded signals is the possibility of the occurrence of an error during transmission of the encoded video signal. Since each interframe-coded frame is directly related to other frames, errors that occur in one frame propagate to all frames that are influenced by (i.e., dependent upon directly or indirectly) the frame in which the error occurred. This results in the loss of multiple frames of data even though the original error occurred only in a single interframe-coded frame. This "chain-like" influence results in a substantially damaged video signal.

To reduce the effect of the above described error propagation, it is known to include so-called frame-limit coded frames of video data with the transmitted interframe coded frames. Each frame-limit coded frame is formed by frame-limit coding only one frame of video data such that upon receipt of the frame-limit coded frame, the video data corresponding to one frame may be reconstructed by decoding only the frame-limit coded frame without the need for obtaining information from any other frame.

When transmitting frame-limit coded frames with interframe coded frames, a single frame-limit coded frame is first transmitted followed by a predetermined number of interframe-coded frames, wherein each of the interframe-coded frames are related to (dependent upon) that frame-limit coded frame. For example, upon receiving the coded signal, the second video frame is reconstructed by utilizing the data in the frame-limit coded frame (the first transmitted frame) and the first interframe coded frame (the second transmitted frame); the third video frame is reconstructed by utilizing the data in the first interframe coded frame (the second transmitted frame) and the second interframe coded frame (the third transmitted frame), and so on. After a predetermined number of interframe-coded frames are transmitted, the cycle repeats, wherein a frame-limit coded frame is transmitted, followed by the predetermined number of interframe coded frames. Thus, errors which occur in a frame during transmission will affect only the successively transmitted frames up to, but not including, the next frame-limit coded frame.

It is sometimes desirable to transmit scrambled video data, one example being the commercial benefit of scrambling video signals by a cable broadcasting station, e.g., the broadcast of a program for the commonly known "Pay Per View" channels. When scrambled video data is transmitted, a subscriber (i.e., viewer) who receives a "scrambled" channel must have a descrambling device which descrambles the received video signal in order to be able to view the broadcast program. If the scrambled video signal were viewed (e.g., on a video monitor) without first being descrambled, the image would be unrecognizable.

Three types of scrambled video signals are known as fully scrambled video signals, intermittently scrambled video signals and partially scrambled video signals. The fully scrambled video signal is completely scrambled, that is, each and every frame of video data is scrambled and each portion (e.g., block) of each frame is scrambled. When descrambling a fully scrambled video signal, each and every frame must be descrambled for the image to be totally recognizable and if any frames are not descrambled, the corresponding images would be unrecognizable. The intermittently scrambled video signal, which is scrambled in an "intermittent scrambling mode", includes scrambled frames of video data and non-scrambled frames of video data such that a descrambling device should only descramble those frames that have been previously scrambled. If none of the frames of an intermittently scrambled video signal are descrambled, the video image would be intermittently recognizable when viewed on a monitor. The partially scrambled video signal, which is scrambled in a "partial scrambling mode", contains frames of video data partially scrambled, that is, a portion of each frame is not scrambled and, thus, is recognizable when viewed even in the absence of descrambling. Of course, that portion of the frame which is scrambled is unrecognizable unless it is descrambled.

When video data is frame-limit coded and interframe coded as previously described, and also intermittently scrambled or partially scrambled, it is necessary (upon receipt of the scrambled signal) to descramble only selected portions of the video signal (i.e. those portions which have been scrambled) in order for the video signal to be properly descrambled and viewed. When frame-limit coded frames and interframe coded frames are intermittently scrambled prior to transmission, a receiving device must descramble only those frames that were scrambled prior to transmission. However, such a descrambling device is extremely complex since it is difficult to determine whether a frame has been scrambled or not, and also, since interframe coded frames are dependent upon other frames, there may be frames that are dependent upon both scrambled and non-scrambled frames, which adds to the complexity of such a system.

Similarly, when frame-limit coded frames and interframe coded frames are partially scrambled prior to transmission, blocks of video data of each interframe coded frame, which similarly may be scrambled or not scrambled, are dependent upon blocks of data within other frames, which likewise may or may not be scrambled, thus requiring complex calculations to properly descramble the signal. Further blocks of data within a specific frame may also be dependent upon other blocks of data within the same specific frame, which again, may or may not be scrambled.

In addition to the above described problems, intermittently scrambling and partially scrambling frame-limit coded and interframe coded video signals removes some of the advantages associated with transmitting intermittently scrambled and partially scrambled video signals. For example, during transmission of a video signal, it may be desirable to have a portion of that video signal recognizable (e.g., by a viewer). One example of such a case is the desire to entice a viewer to pay a fee in order to view the transmitted signal fully descrambled (e.g., as in the above mentioned pay-per-view channel example). Ordinarily, when intermittently scrambled video signals are viewed without being descrambled, there may be, for example, several, seconds of non-scrambled images at various times of transmission. Similarly, partially scrambled signals allow a viewer to recognize a small (or large) portion of each image. However, these advantages and other advantages of transmitting intermittently scrambled or partially scrambled video signals disappear when the video signals are frame-limit coded and interframe coded prior to transmission.

OBJECTS OF THE INVENTION

Therefore, it is an object of the present invention to provide apparatus for scrambling digital video data which overcomes the above described problems.

Another object of the present invention it to provide apparatus for scrambling digital video data in an intermittent scrambling mode or a partial scrambling mode whose construction is not unduly complicated.

A further object of the present invention is to provide an intermittently or partially scrambled digital video signal whose data structure is not unduly complicated and which contains data indicating which frames or which blocks are scrambled.

An additional object of this invention is to provide an intermittently or partially scrambled digital video signal which is intermittently or partially recognizable when the video signal is not descrambled.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus for intermittently scrambling a digital video signal operates to encode a digital video signal and supply successive frames of video data (i.e., frame-limit coded frames each followed by a predetermined number of interframe coded frames) where each frame has a respective frame number, by adding scramble-off data to each frame which has a frame number equal to one of a plurality of predetermined frame numbers, by scrambling each frame which does not have the scramble-off data (or which has scramble-on data), and by providing the frames of video data which have the scramble-off data (i.e. the non-scrambled frames) and the scrambled frames of video data as an intermittently scrambled video signal.

As one aspect of the present invention, scramble-off data is added to each frame-limit coded frame which has a frame number equal to one of the plurality of predetermined frame numbers, and scramble-off data also is added to each of the predetermined number of interframe coded frames which are successively supplied after the frame-limit coded frames which have the scramble-off data. That is, if scramble-off data is added to a particular frame-limit coded frame, then scramble-off data also is added to those interframe coded frames that follow this frame-limit coded frame.

In accordance with another embodiment of the present invention, apparatus for partially scrambling a digital video signal operates to encode a digital video signal and supply Successive frames of video data (i.e., frame-limit coded frames each followed by a predetermined number of interframe coded frames) where each frame has respective blocks of video data and each block of video data has a respective block number for identifying the block within the frame, by adding block-scramble-off data to each block of video data which has a block number equal to one of a plurality of predetermined block numbers, by scrambling each block of video data which does not have the block-scramble-off data (or has block-scramble-on data), and by providing, for each frame, the blocks of video data which have the block-scramble-off data (i.e. the unscrambled blocks) and the scrambled blocks of video data as a partially scrambled video signal.

As one aspect of this invention, scramble-off data is added to each block which has a block number equal to one of the plurality of predetermined block numbers in those frame-limit coded frames which have a frame number equal to one of a plurality of predetermined frame numbers, and scramble-off data also is added to each block which has a block number equal to one of the plurality of predetermined block numbers in those predetermined number interframe coded frames which are successively supplied after those frame-limit coded frames which have a frame number equal to one of the plurality of predetermined frame numbers.

As another aspect of this invention, frame-scramble-off data is added to each frame which has a frame number equal to one of a plurality of predetermined frame numbers, all blocks of video data of those frames which do not have the frame-scramble-off data are scrambled, and those blocks of video data which do not have block-scramble-off data of the other frames which have the frame-scramble-off data are scrambled. That is, if a frame contains the frame-scramble-off data, those blocks in that frame are not scrambled if such blocks contain the block-scramble-off data. But those blocks in said frame which do not contain the block-scramble-off data are scrambled, thus resulting in a partially scrambled digital video signal.

In accordance with a further embodiment of the present invention, apparatus for scrambling a digital video signal is operable in an intermittent scrambling mode or a partial scrambling mode to encode a digital video signal and supply successive frames of video data (i.e., frame-limit coded frames each followed by a predetermined number of interframe coded frames), where each frame has a respective frame number and is formed of blocks of video data with each block including a respective block number for identifying the block within that frame. Frame-scramble-off data is added to each frame which has a frame number equal to one of a plurality of predetermined frame numbers and block-scramble-off data is added to each block within each frame if that block has a block number equal to one of a plurality of predetermined block numbers. All of the blocks of those frames which do not have the frame-scramble-off data are scrambled in both the intermittent scrambling mode and the partial scrambling mode, and, in the partial scrambling mode only, those blocks which do not have the block-scramble-off data in those frames which have the frame-scramble-off data are scrambled.

As one aspect of this invention, frame-scramble-off data is added to each frame-limit coded frame which has a frame number equal to one of the plurality of predetermined frame numbers, and frame-scramble-off data also is added to each of the predetermined number of interframe coded frames which are supplied in succession after those frame-limit coded frames.

In accordance with yet another embodiment of the present invention, apparatus for descrambling an intermittently scrambled digital video signal operates to receive a coded digital video signal (e.g., having frame-limit coded and interframe coded frames) which is composed of non-scrambled frames and scrambled frames of video data with each non-scrambled frame of video data containing scramble-off data. Each frame of video data that does not have the scramble-off data is descrambled, and each non-scrambled frame and descrambled frame is decoded to produce a decoded digital video signal.

In accordance with a further embodiment of the present invention, apparatus for descrambling a partially scrambled digital video signal operates to receive frames of video data (e.g., a series of frames formed of a frame-limit coded frame followed by interframe coded frames), with each frame being comprised of blocks of video data and each block contains either block scramble-off data or block scramble-on data. Each block which has the block scramble-on data is descrambled and decoded along with each block that has the block scramble-off data to produce a decoded digital video signal.

In accordance with another embodiment of the present invention, apparatus for descrambling an intermittently scrambled or partially scrambled digital video signal operates to receive frames of video data (e.g., a series of frames formed of a frame-limit coded frame followed by interframe coded frames), with each frame containing frame scramble-on data or frame scramble-off data and each frame being comprised of blocks of video data that contain either block scramble-on data or block scramble-off data. Each block that has the block scramble-on data and that is included in a frame that has the frame scramble-on data is descrambled, whereas the remaining blocks are not descrambled. Each descrambled block of video data and each block that is not descrambled is decoded to produce a decoded digital video signal.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 2:
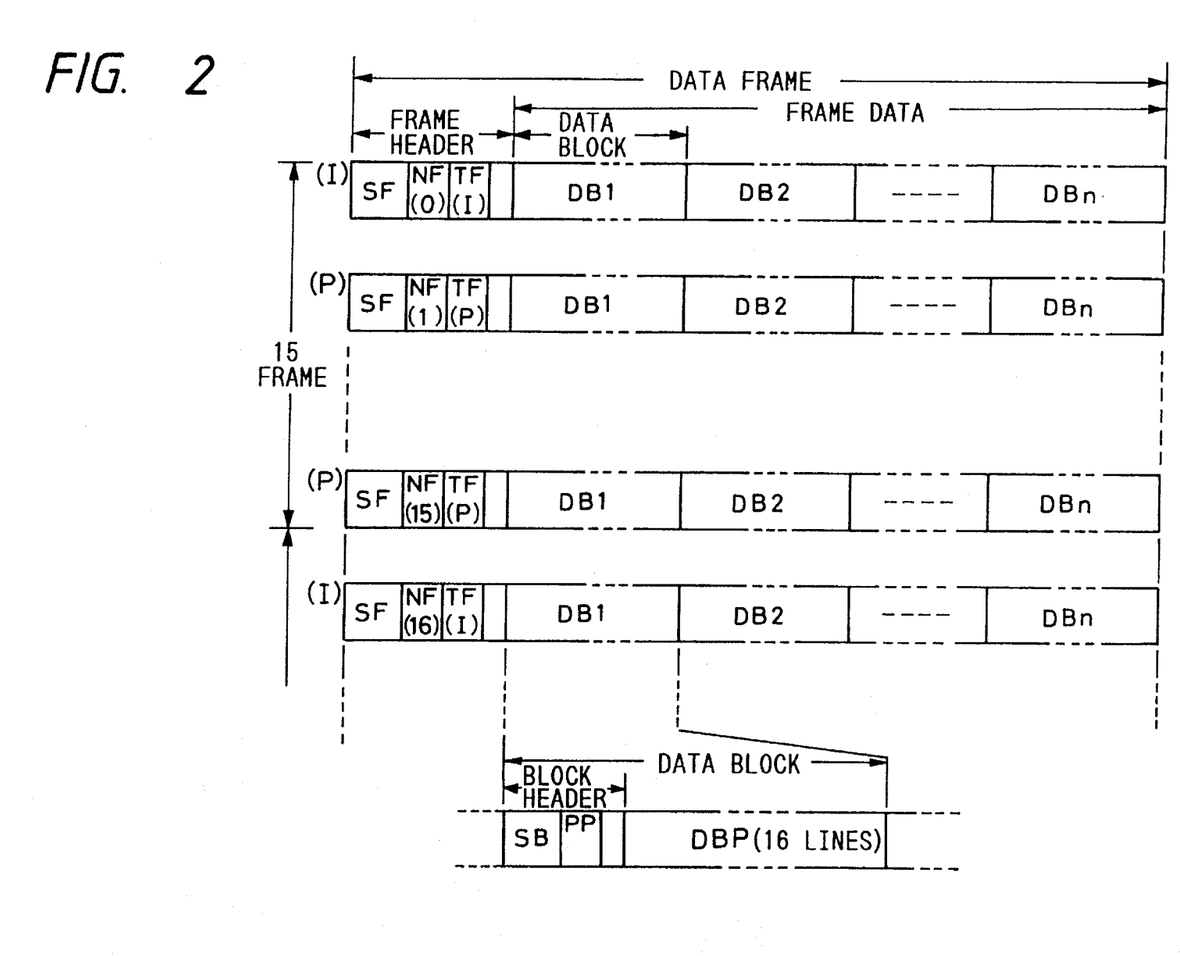
FIG. 2 is a block diagram of the scrambling circuit in which the present invention finds ready application.

Referring now to the drawings, FIG. 2 is a block diagram of the scrambling circuit which incorporates the present invention and includes an encoder 12, a data synthesizer 13 and a data scrambler 21. A digital image signal SDV which is composed of a series of frames (i.e. video frame intervals) of video data is supplied to an input terminal 11 of encoder 12 which encodes the digital signal to produce coded digital video data DVD, formed of, for example, both frame-limit coded frames and interframe coded frames (previously described). Each frame-limit coded frame is followed by a predetermined number, for example, fourteen frames, of interframe-coded data frames. Encoder 12 forms no part of the present invention per se.

Figure 3:
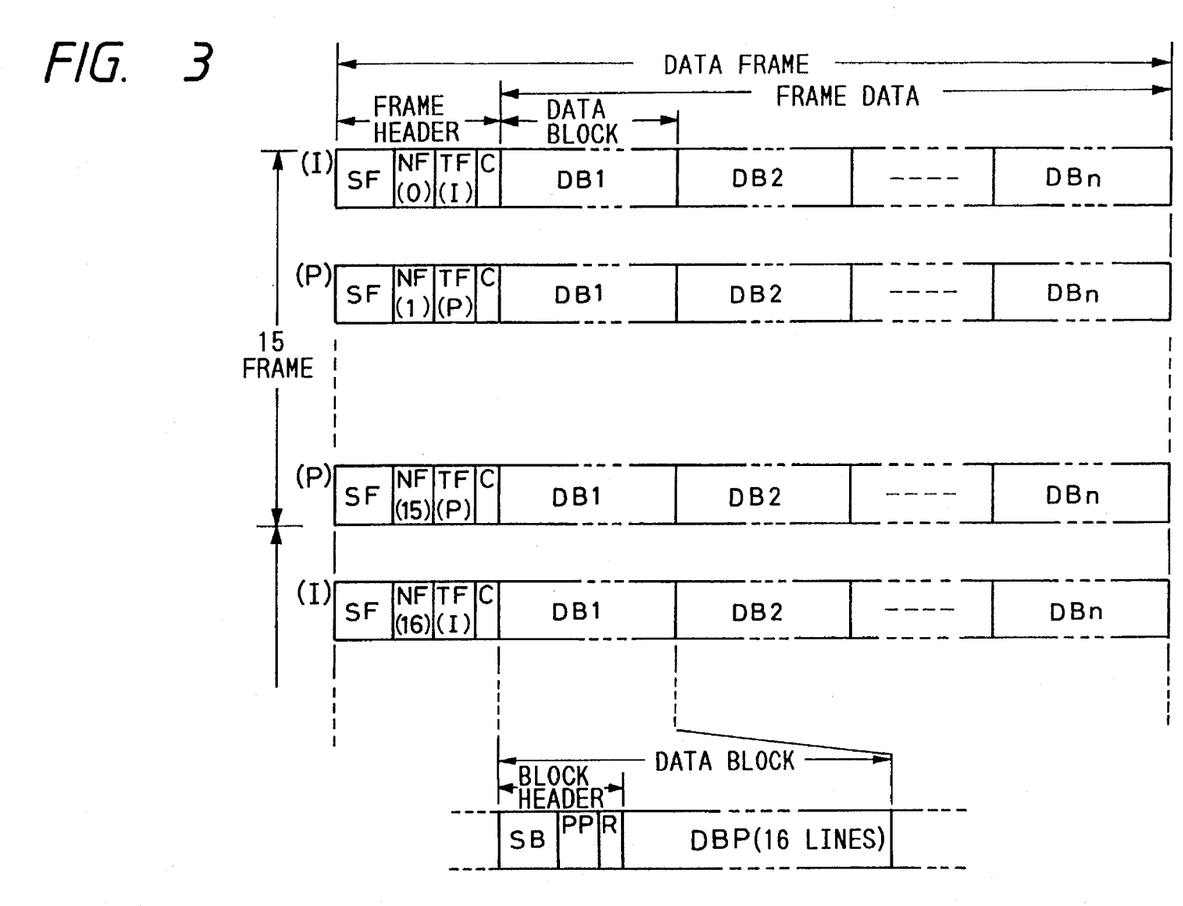
FIGS. 3A to 3E illustrate the data structure of coded digital video data.
Figure 4:
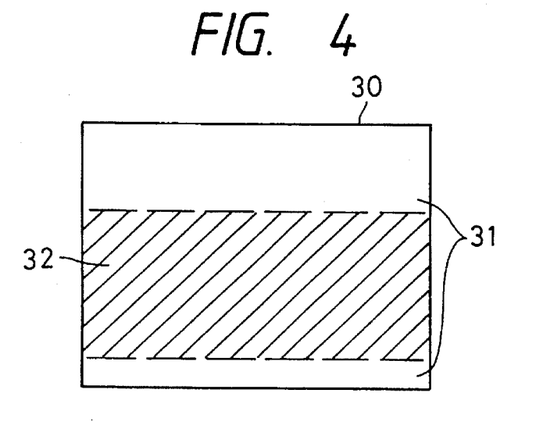
FIGS. 4A to 4E illustrate the data structure of coded digital video data having scramble data.

The data structure of coded digital video data DVD is shown in FIGS. 3A to 3E. FIGS. 3A and 3D illustrate the data structure of frame-limit coded frames and FIGS. 3B and 3C illustrate the data structure of interframe coded frames. As shown, a frame-limit coded frame (FIG. 3A) is followed by, e.g., fourteen, interframe coded frames (FIGS. 3B and 3C), which may then be followed by another frame-limit coded frame (FIG. 3D), followed by another fourteen interframe coded frames (not shown). Each frame-limit coded frame and interframe coded frame includes a frame header followed by a frame data area, the frame header having frame synchronizing data SF, frame number data NF, frame type data TF and frame scramble data (described below). The frame data area includes data blocks DB1, DB2 . . . DBn, with one image frame being formed of n blocks. The data structure of each data block is illustrated in FIG. 3E (discussed below).

The frame synchronizing data SF of each frame is utilized for synchronization when the transmitted frame is received, the frame number data NF identifies the frame number of each frame, and the frame type data TF indicates whether the frame is a frame-limit coded frame ("I" frame) or an interframe coded frame ("P" frame). As illustrated in FIGS. 3A to 3D, the frame number (NF) increases by one for each successive frame. For example, the first frame-limit coded frame (FIG. 3A) has a frame number of "0", the successive frame (FIG. 3B) has a frame number of "1", etc. As to the frame type (TF), the frame-limit coded frames (FIGS. 3A and 3D) are identified by the frame type "I" and the interframe coded frames (FIGS. 3B and 3C) are identified by the frame type "P". The area following the frame type data TF in the frame header of each frame includes frame scramble data and is further discussed below.

The data structure of each data block (DB1, DB2 ... DBn) of each frame is illustrated in FIG. 3E. As shown, each data block has a block header followed by block data DBP. The block header includes block synchronous data SB, image position data PP and block scramble data (discussed below). Block data DBP are obtained by compressing the digital image signal provided at terminal 11 to produce either a frame-limit coded frame or an interframe coded frame, each block data DBP (DB1, DB2 ... DBn) of a frame representing image information of a predetermined portion of that frame. Such predetermined portion may represent, for example, sixteens-line intervals of the image.

The block synchronous data SB is utilized for synchronization when each transmitted block is received; and the image position data PP identifies that block within the frame. In one embodiment of the present invention, image position data PP identifies the spatial location of that block in the reproduced image. In the above example, the image position data PP of a particular block identifies the group of 16 line intervals of the image to which the particular block pertains.

In another embodiment of the present invention, block data DBP represents a block of orthogonally transformed video data where data block DB1 contains, for example, the DC component of the transformed signal and data blocks DB2 to DBn contain the AC frequency components of the transformed signal. Here, image position data PP of each block identifies the frequency components of the transformed video data contained within each block. In this embodiment, encoder 12 includes an orthogonal transformer, for example, a discrete cosine transformer, which is known in the art.

Returning to FIG. 2, coded digital image data DVD are supplied to data synthesizer 13, an "I" frame extractor 14 and an image position detector 15. "I" frame extractor 14 extracts each frame-limit coded frame ("I" frame) supplied by encoder 12 and supplies the extracted frame as data DFI to a frame number detector 16. Frame number detector 16 detects and latches the frame number of the extracted "I" frame, the frame number being identified by frame number data NF in the frame header of the extracted frame, and supplies the frame number data NF to frame number comparator 17. The latched frame number NF is continuously supplied to frame number comparator 17 (i.e. the frame number does not change) until the frame number of the next extracted frame-limit coded frame is detected and latched.

Image position detector 15 detects the image position data PP contained in the data block currently being supplied (of the frame currently being supplied) and supplies this image position data to an image position comparator 18.

The apparatus of the present invention for scrambling digital video data is operable to scramble digital video data in an intermittent scrambling mode and in a partial scrambling mode to produce an intermittently scrambled digital video signal and a partially scrambled digital video signal, respectively. Operation in the intermittent scrambling mode will first be described.

In the intermittent scrambling mode, a scramble setting block 19 supplies to frame number comparator 17 frame number data NFC which identifies the frame numbers of those frames which are not to be scrambled prior to transmission, that is, prior to being supplied as an output by the present invention. In a preferred embodiment, frame number data NFC only identifies those frame-limit coded frames which are not to be scrambled since extractor 14 extracts only frame-limit coded frames. Scramble setting block 19 does not supply any image position data PPR to image position comparator 18 in the intermittent scrambling mode since image position data is utilized exclusively in the partial scrambling mode (to be described).

Frame number comparator 17 compares the frame number NF supplied by frame number detector 16 with the frame numbers identified in frame number data NFC. If data NFC includes (i.e., identifies) frame number NF, an output signal DO indicative of this comparison is supplied, for example, as a high level output to scramble data generator 20. On the other hand, if the frame number NF is not included in frame number data NFC, then output signal DO indicates that there is no match and, for example, a low level output is supplied to the scramble data generator. Output signal DO is continuously supplied to scramble data generator 20 (i.e. it does not change) until the frame number of the next extracted frame-limit coded frame is detected. Thus, signal DO remains at its high state, or its low state, throughout the entire time that a frame-limit coded frame and the successive predetermined number (e.g. fourteen) of interframe coded frames are supplied by encoder 12.

The image position comparator 18 compares the image position data PP supplied from the image position detector 15 with the image positions identified in image position data PPR supplied by scramble setting block 19. Since no image position data PPR is supplied by scramble setting block 19 in the intermittent scrambling mode, no match is detected and an output signal DQ indicative of this result, e.g., a low level output, is continuously supplied to scramble data generator 20.

Scramble setting block 19 also supplies a mode signal CSM to scramble data generator 20 and data scrambler 21 which indicates whether the apparatus for scrambling digital video data is operating in the intermittent scrambling mode (e.g., signal CSM is "high") or in the partial scrambling mode (e.g., signal CSM is "low"). When scramble data generator 20 receives signal DO in its high state in the intermittent scrambling mode (that is, when signal CSM is "high"), it supplies frame scramble data "C" having a value "0" (e.g., frame scramble-off data) to data synthesizer 13 to indicate that the frame being supplied by encoder 12 is not to be scrambled. That is, when frame number NF matches one of the frame numbers identified in frame number data NFC indicating that the frame NF is to not be scrambled, frame number comparator 17 supplies signal DO with a high state to scramble data generator 20, which in turn, supplies frame scramble data "C" having the value "0" to data synthesizer 13. On the other hand, when scramble data generator 20 receives signal DO with a low state, it supplies frame scramble data "C" having the value "1" (frame scramble-on) to data synthesizer 13 to indicate that the frame being supplied by encoder 12 is to be scrambled.

In the intermittent scrambling mode described herein, frame scramble data "C" is produced independent of the value of output DQ from image position comparator 18. Also, scramble data generator 20 supplies block scramble data "R" having the value "1" to data synthesizer 13 throughout the intermittent scrambling mode. Output DQ and block scramble data "R" are utilized in the partial scrambling mode to indicate whether a block within a frame is to be scrambled and is further discussed below.

Data synthesizer 13 adds the frame scramble data "C" to each of the frame-limit-coded frames and interframe-coded frames in signal DVD supplied by encoder 12 in the frame scramble data area following the frame type data TF in the frame header as illustrated in FIGS. 4A to 4D. In addition, the block scramble data "R" is added to the block header after the image position data PP in each data block of each frame as illustrated in FIG. 4E. Data synthesizer 13 supplies signal DVD with the added data "C" and "R" as the synthesized digital video data DVX to data scrambler 21.

Therefore, frame scramble data "C" indicating "scramble-off" (e.g., "C" has the value "0") is added to each frame-limit coded frame whose frame number matches one of the frame numbers identified in frame number data NFC and also is added to those predetermined number of interframe coded frames successively supplied after the frame-limit coded frames (i.e., it is added to the fourteen next-following interframe coded frames). Frame scramble data "C" indicating "scramble-on" (e.g., "C" has the value "1") is added to the other frames. Block scramble data "R" having the value "1" is added to all of the data blocks in all of the frames in the intermittent scrambling mode. This represents that all of the blocks of a frame are designated to be scrambled when that frame is designated to be scrambled.

Data scrambler 21 receives from scrambling setting block 19 mode signal CSM, which indicates the mode in which the apparatus of the present invention is operating. In the intermittent scrambling mode, data scrambler 21 scrambles those frames in the synthesized digital video data DVX with frame scramble data "C" having the value "1" (scramble-on data) regardless of the value of the block scramble data "R" in each data block, and does not scramble frames with frame scramble data "C" having the value "0" (scramble-off data) regardless of the value of the block scramble data "R" in each data block. Data scrambler 21 supplies the intermittently scrambled digital video signal DSVX at terminal 22.

In another embodiment of the present invention, scramble data generator 20 supplies frame scramble data "C" having the value "0" (frame scramble-off) to data synthesizer 13 only when the scramble data generator receives signal DO having the value "0" (frame scramble-off) and a frame-limit coded frame is being supplied by encoder 12. That is, only frame-limit coded frames are not scrambled when the frame number of those frames matches one of the frame numbers identified in frame number data NFC, and all other frames, that is, all interframe coded frames as well as all other frame-limit coded frames, are scrambled.

In a further embodiment of the present invention, mode signal CSM is not provided by scramble setting block 19 to either scramble data generator 20 or data scrambler 21. In this further embodiment, data scrambler 21 scrambles only those blocks with block scramble data "R" having the value "1" (block scramble-on) in those frames with frame scramble data "C" having the value "1" (frame scramble-on). Since the block scramble data "R" in the intermittent scrambling mode is always "1", the effect of this further embodiment is essentially the same as the embodiment described above except it is not necessary for the scramble setting block to supply a mode signal to data scrambler 21 indicating the mode of operation.

The partial scrambling mode will now be described with reference to FIG. 2. In the partial scrambling mode, encoder 12 and "I" frame extractor 14 operate in essentially the same manner as in the intermittent scrambling mode. Scramble setting block 19 supplies frames number data NFC to frame number comparator 17 and also supplies block scramble data PPR to image position comparator 18. Frame number data NFC identifies the frame numbers of those frame-limit coded frames which are not to be scrambled, similar to the intermittent scrambling mode. Block scramble data PPR identifies those blocks of each frame which are not to be scrambled.

Frame number comparator 17 compares the frame number NF of each frame-limit coded frame with the frame numbers identified in frame number data NFC and supplies the output signal DO indicative of this result, that is, a high level is supplied when there is a match, and a low level is supplied when there is no match. Similarly, image position comparator 18 compares the image position data PP of each block, as supplied from the image position detector 15 with the image positions (e.g., blocks) identified in image position data PPR and supplies output signal DQ to scramble data generator 20 to indicate whether a particular block is identified in signal PPR. If so, signal DQ is supplied in, for example, its high state, and if not, signal DQ is supplied in its low state.

Scramble setting block 19 supplies mode signal CSM in its low state to scramble data generator 20 and data scrambler 21 to indicate that the apparatus is currently operating in the partial scrambling mode. When scramble data generator 20 receives signal CSM in its low state, it supplies frame scramble data "C" having the value "1" (frame scramble-on) to data synthesizer 13 irrespective of the values of signals DO and DQ. When both signals DO and DQ are in their high state, that is, when frame number NF is identified in frame number data NFC and image position PP is identified in image position data PPR, scramble data generator 20 supplies block scramble data "R" having the value "0" (e.g., block scramble-off) to data synthesizer 13 to indicate that the block being supplied by encoder 12 is to not be scrambled. When scramble data generator 20 receives either signal DO or signal DQ in its low state, block scramble data "R" having the value "1" (block scramble-on) is supplied to data synthesizer 13. That is, if the image position PP does not match one of the block numbers identified in image position data PPR or if the frame number NF does not match one of the frame numbers identified in frame number data NFC, the block currently being supplied by encoder 12 is designated to be scrambled.

Data synthesizer 13 adds the frame scramble data "C" to each of the frames (both frame-limit coded and interframe coded frames) in the frame scramble data area (FIGS. 4A to 4D) and adds the block scramble data "R" to each data block of each frame in the block header (FIG. 4E) in essentially the same manner as in the intermittent scrambling mode described above. Data synthesizer 13 supplies the synthesized digital video data DVX to data scrambler 21.

Data scrambler 21 receives mode signal CSM in its low state which indicates that the apparatus is in the partial scrambling mode. In response to this mode signal, data scrambler 21 scrambles each block containing block scramble data "R" having the value "1" (block scramble-on) regardless of the value of the frame scramble data "C" in the frame in which this block is included, and does not scramble those blocks containing block scramble data "R" having the value "0" (block scramble-off) regardless of the value of the frame scramble data "C" in the frame. Data scrambler 21 supplies the partially scrambled digital video signal DSVX to terminal 22.

In another embodiment of the present invention operating in the partial scrambling mode, mode signal CSM is not provided by scramble setting block 19 to either scramble data generator 20 or data scrambler 21. Here, data scrambler 21 scrambles only those blocks containing block scramble data "R" having the value "1" (block scramble-on) if those blocks are included in a frame with the frame scramble data "C" having the value "1" (frame scramble-on). Since the frame scramble data "C" in the partial scrambling mode is always "1", the effect of this embodiment is essentially the same as the first embodiment operating in the partial scrambling mode described above, except that scramble setting block 19 does not supply mode signal CSM to data scrambler 21.

In a further embodiment of the present invention operating in the partial scrambling mode, scramble data generator 20 supplies frame scramble data "C" having the value "0" (frame scramble-off) to data synthesizer 13 when signal DO is in its high state, and supplies frame scramble data "C" having the value "1" (frame scramble-on) when signal DO is in its low state, similar to the intermittent scrambling mode. In addition, scramble data generator 20 supplies block scramble data "R" having the value "0" (block scramble-off) to data synthesizer 13 when signal DQ is in its high state, and supplies block scramble data "R" having the value "1" (block scramble-on) when signal DQ is in its low state. In this embodiment, data scrambler 21 scrambles only those blocks with block scramble data "R" having the value "1" (block scramble-on) if those blocks are included in frames when frame scramble data "C" has the value "1" (frame scramble-on).

Figure 5:
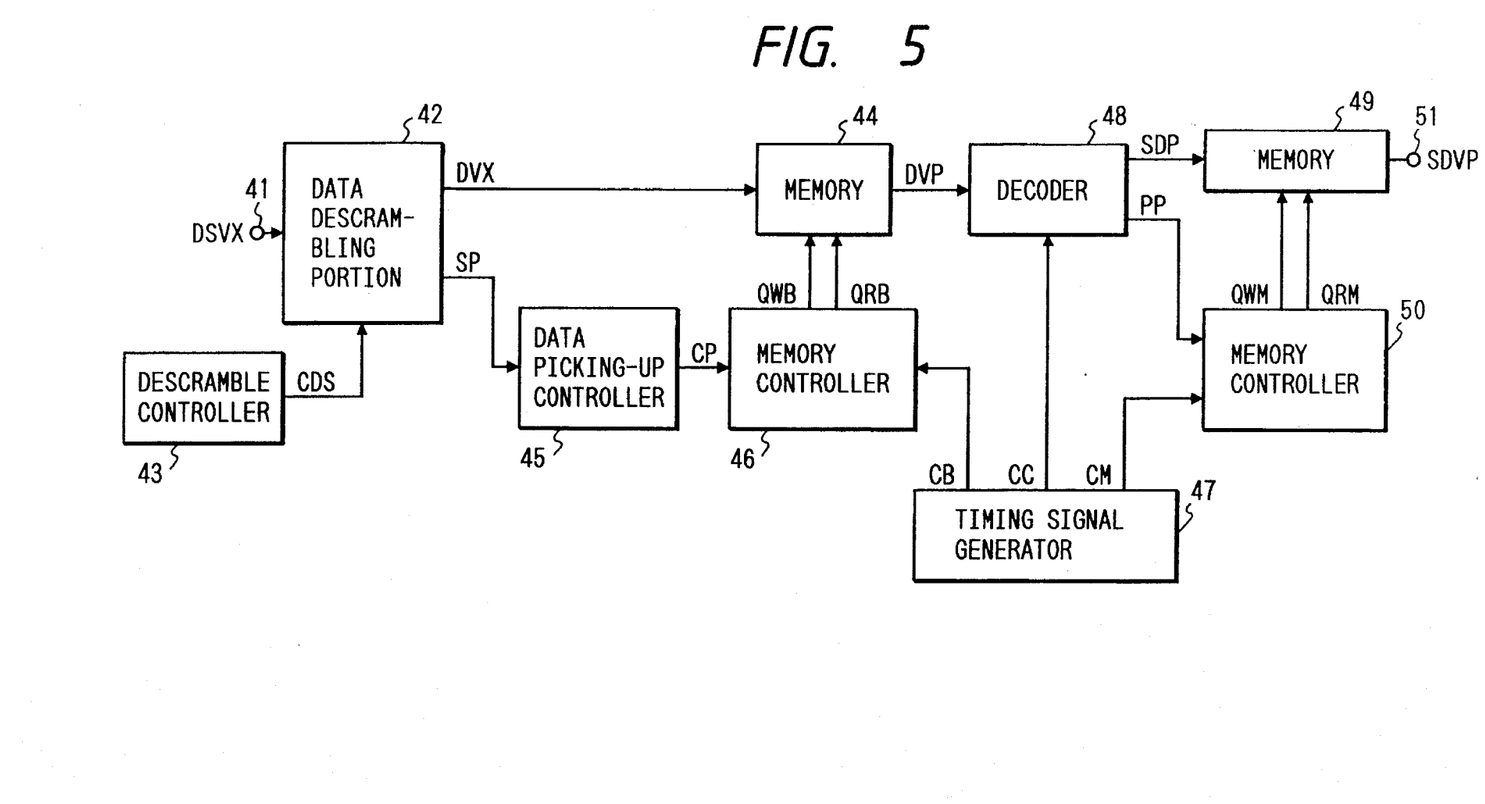
FIG. 5 represents a video image of one frame of partially scrambled video data produced in accordance with the present invention.

In the embodiments discussed above concerning the partial scrambling mode, the partially scrambled digital video signal DSVX supplied at terminal 22 includes frame-limit coded frames followed by scrambled interframe coded frames as well as frame-limit coded frames followed by non-scrambled interframe coded frames. When these video signals are displayed on, for example, a video monitor without descrambling an image having a partially recognizable area is provided. FIG. 5 illustrates an image 30 of the partially scrambled signal wherein areas 31 represent portions of the image that are not scrambled, and therefore, are recognizable, and area 32 represents the portion of the image which is scrambled and thus is not recognizable.

Figure 6:
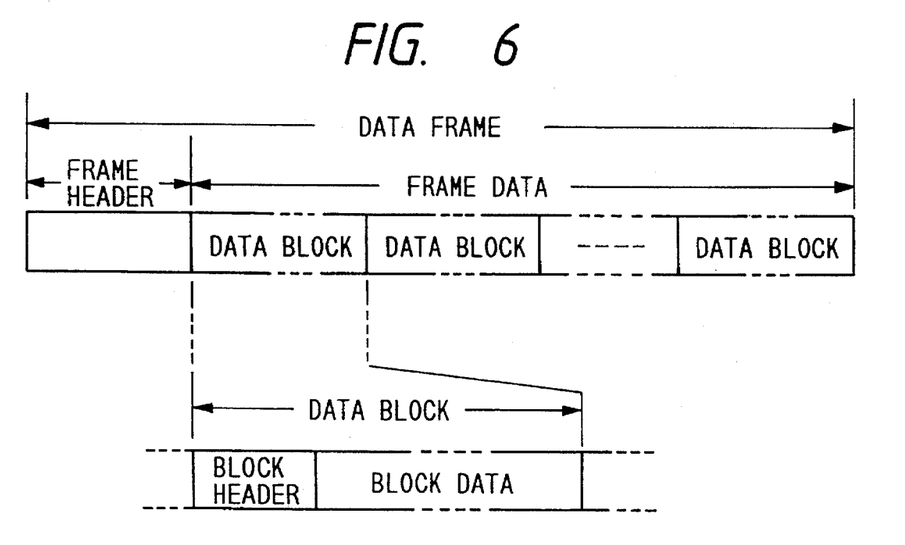
FIG. 6 is a block diagram of the descrambling circuit of the present invention.

FIG. 6 illustrates apparatus for descrambling intermittently add partially scrambled digital video signals in which the present invention finds ready application. As shown, intermittently or partially scrambled digital video signal DSVX is received at terminal 41 of a data descrambler 42. A descramble controller 43 supplies a descramble control signal CDS to descrambler 42 which identifies whether signal DSVX is an intermittently scrambled or partially scrambled digital video signal. Descrambler 42 descrambles signal DSVX in accordance with the descramble control signal CDS. When signal DSVX is an intermittently scrambled digital video signal, as indicated by control signal CDS, descrambler 42 descrambles those frame-limit coded and interframe coded frames whose frame scramble data "C" has the value "1" (frame scramble-on) and does not descramble the other frames of video data of signal DSVX (whose frame scramble data "C" has the value "0"). After descrambler 42 completes descrambling of the specified frames, it supplies a descramble signal SP to data pickup controller 45 to indicate descrambling is complete.

Similarly, when signal DSVX is a partially scrambled digital video signal, as indicated by control signal CDS, descrambler 42 descrambles each block whose block scramble data "R" has the value "1" (block scramble-on). Descrambler 42 does not descramble those blocks whose block scramble data "R" has the value "0" (block scramble-off). Descrambler 42 then supplies descramble signal SP to data pickup controller 45 to indicate descrambling of the partially scrambled digital video signal is complete.

Upon descrambling the intermittently or partially scrambled digital video signal, descrambler 42 supplies the descrambled digital video data DVX to a memory 44 and simultaneously supplies descramble signal SP to data pickup controller 45. Data pickup controller 45 produces a command signal CP in response to descramble signal SP for controlling to memory 44 a memory controller 46. Memory controller 46 supplies to memory 44 a write control signal QWB in response to command signal CP to cause memory 44 to store the descrambled digital video data DVX supplied from descrambler 42.

A timing signal generator 47 produces a data read command signal CB which is supplied to memory controller 46, the latter responding thereto to produce a read control signal QRB that is supplied to memory 44 to prevent the latter from overflowing. Read control signal QRB controls memory 44 to readout the descrambled digital video data DVX stored in its memory; and this data (signal DVP) is supplied to a decoder 48. Decoder 48 decodes signal DVP in response to a timing control signal CC supplied from timing signal generator 47 to produce "sectioned" digital image signal SDP which corresponds to one block of data. Signal SDP is obtained by decoding each block of data DBP (FIG. 4E) contained within each data block DB1 to Dbn in each frame-limit-coded frame and each interframe-coded frame. Signal SDP is then supplied to a memory 49, which is, for example, a frame memory for accumulating and storing one frame of video data. Decoder 48 supplies to a memory controller 50 the image position data PP contained within the block of data that is currently being decoded. In one embodiment, decoder 48 includes an inverse orthogonal transform circuit, e.g., an inverse discrete cosine transform circuit, to convert a transformed digital signal to the time domain.

Memory controller 50 produces a write control signal QWM in response to the image position data PP and supplies this write control signal QWM to memory 49, wherein the sectioned digital image signal SDP is stored at an address corresponding to the image position data PP. Therefore, each sectioned digital image signal SDP successively produced by decoder 48 is stored at a respective address in memory 49. The timing signal generator 47 supplies a data read command signal CM to memory controller 50 at predetermined times, whereupon the memory controller produces a read control signal QRM to cause memory 49 to reproduce one frame of the stored sectioned digital image signals SDP and to supply the resulting digital video signal SDVP as an output at terminal 51.

In another embodiment of the present invention, descrambler 42 descrambles only those blocks whose block scramble data "R" has the value "1" (block scramble-on) if those blocks are contained in a frame whose frame scramble data "C" has the value "1" (frame scramble-on). Here, descramble controller 43 may be omitted because descrambler 42 will properly descramble signal DSVX whether it is an intermittently scrambled digital video signal or a partially scrambled digital video signal.

In a further embodiment, descrambler 42 descrambles all frames except those frame-limit coded frames whose frame scramble data "C" has the value "0" (frame scramble-off) when signal DSVX is an intermittently scrambled digital video signal. When signal DSVX is a partially scrambled digital video signal, descrambler 42 descrambles all blocks except those blocks whose block scramble data "R" has the value "0" (block scramble-off) in those frames whose frame scramble data "C" has the value "0" (frame scramble-off).

While the present invention has been particularly shown and described in conjunction with preferred embodiments thereof, it will be readily appreciated by those of ordinary skill in the art that various changes and modifications may be made without departing from the spirit and scope of the invention. For example, while only digital video signals have been described as being scrambled and descrambled, the present invention is not limited to this type of signal and may be used in conjunction with other types of signals, such as audio or other data signals.

As another example, although the present discussion is directed to scrambling and descrambling frame-limit coded and interframe coded frames of video data, the present invention is not limited solely to these types of coded signals but may be applied to signals admitting of other types of coding formats.

Therefore, it is intended that the appended claims be interpreted as including the embodiments described herein, the alternatives mentioned above, and all equivalents thereto.

What is claimed:

1. Apparatus for partially scrambling a digital video signal, comprising:

means for encoding a digital video signal to supply successive frames of video data as an output, each of said frames of video data being comprised of blocks of video data with each block including a respective block number for identifying that block within the frame;

means for adding block-scramble-off data to those blocks of video data having a block number equal to one of a plurality of predetermined block numbers;

means for scrambling each of said blocks of video data not having said block-scramble-off data to produce respective scrambled blocks of video data; and means for providing, for each frame of video data, said scrambled blocks of video data together with those blocks of video data having said block-scramble-off data as a partially scrambled video signal.

2. The apparatus of claim 1, wherein said means for encoding is operable to supply a frame-limit coded frame followed by a preselected number of interframe coded frames, each frame-limit coded frame and each interframe coded frame being comprised of respective blocks of video data.

3. The apparatus of claim 2, wherein said means for adding is operable to add said block-scramble-off data to each block of video data having one of said predetermined block numbers when said block is in a frame-limit coded frame or an interframe coded frame having a frame number equal to one of a plurality of predetermined frame numbers.

4. The apparatus of claim 3, wherein said predetermined frame numbers are frame numbers of frame-limit coded frames only.

5. The apparatus of claim 3 further comprising means for extracting the frame number from a frame-limit coded frame currently supplied by said encoding means, and means for detecting the block number from a block of video data currently supplied by said encoding means; and wherein said means for adding is operable to add said block-scramble-off data to said currently supplied block of video data when the extracted frame number is one of said predetermined frame numbers and the detected block number is one of said predetermined block numbers.

6. The apparatus of claim 1, wherein said block number of each block of video data represents a spatial position of the respective block within a video image represented by said blocks of video data.

7. The apparatus of claim 1, wherein said encoding means includes means for orthogonally transforming each of said frames of video data to supply frames of transformed video data, and wherein the block number of each block of transformed video data represents a frequency component of said transformed data.

8. The apparatus of claim 1, wherein each of said blocks of video data contains a block header and block data, said block header including said block number and block scramble on/off data.

9. The apparatus of claim 1, wherein said means for adding is further operable to add block-scramble-on data to those blocks of video data not having block-scramble-off data; and wherein said means for scrambling is operable to scramble each of said blocks of video data having said block-scramble-on data.

10. The apparatus of claim 1, wherein each of said frames of video data includes a respective frame number; and wherein said means for adding is operable to add frame-scramble-off data to each frame having a frame number equal to one of a plurality of predetermined frame numbers, said means for scrambling is operable to scramble all of the blocks of video data in those frames not having said frame-scramble-off data and to scramble those blocks of video data not having said block-scramble-off data but included in those frames having said frame-scramble-off data, and said means for providing is operable to provide frames of scrambled and unscrambled blocks of video data as said partially scrambled video signal.

11. Apparatus operable in an intermittent scrambling mode and a partial scrambling mode for scrambling a digital video signal, comprising:

means for encoding a digital video signal to supply successive frames of video data as an output, each of said frames of video data having a respective frame number and being comprised of blocks of video data with each block including a respective block number for identifying that block within the frame;

means for adding frame-scramble-off data to those frames of video data having a frame number equal to one of a plurality of predetermined frame numbers and for adding block-scramble-off data to those blocks of video data having a block number equal to one of a plurality of predetermined block numbers;

scrambling means operable in both said intermittent scrambling mode and said partial scrambling mode to scramble all of said blocks of video data included in those frames not having said frame-scramble-off data, and operable in said partial scrambling mode only to scramble each block of video data not having said block-scramble-off data in those frames having said frame-scramble-off data; and for providing as a scrambled video signal a frame comprised selectively scrambled and selectively unscrambled blocks of video data.

12. The apparatus of claim 11, wherein said means for encoding is operable to supply a frame-limit coded frame followed by a preselected number of successive interframe coded frames.

13. The apparatus of claim 12, wherein said means for adding is operable to add said frame-scramble-off data to each frame-limit coded frame having one of said predetermined frame numbers and to add said frame-scramble-off data to each of said preselected number of interframe coded frames that follow a frame-limit coded frame having said predetermined frame number.

14. The apparatus of claim 13, wherein said predetermined frame numbers are frame numbers of frame-limit coded frames only.

15. The apparatus of claim 12, further comprising means for extracting the frame number from a frame-limit coded frame currently supplied by said encoding means, and wherein said means for adding is operable to add said frame-scramble-off data to said currently supplied frame when the extracted frame number is equal to one of said predetermined frame numbers.

16. The apparatus of claim 12, further comprising means for detecting said block number of a currently supplied block of video data, and wherein said means for adding is operable to add block-scramble-off data to said currently supplied block when said detected block number is equal to one of said predetermined block numbers.

17. The apparatus of claim 11, wherein said block number of each block of video data represents a spatial position of the respective block within a video image represented by said blocks of video data.

18. The apparatus of claim 11, wherein said encoding means includes means for orthogonally transforming each of said frames of video data to supply frames of transformed video data, and wherein a block of transformed video data represents a respective frequency component of said transformed frame.

19. Apparatus for descrambling a partially scrambled digital video signal, comprising:

means for receiving frames of video data, each frame being comprised of respective blocks of video data with each block having either block scramble-off data or block scramble-on data;

means for descrambling each of said blocks of video data having said scramble-on data to produce respective descrambled blocks of video data; and means for decoding said descrambled blocks of video data and said blocks of video data having said block scramble-off data to produce a decoded digital video signal.

20. The apparatus of claim 19, wherein the received frames of video data are comprised of a frame-limit coded frame followed by interframe coded frames.

21. The apparatus of claim 19 wherein each frame of video data includes a frame header and said respective blocks of video data, said frame header including a frame number, frame type data and scramble on/off data.

22. The apparatus of claim 21, wherein the received frames of video data are orthogonally transformed; and said means for decoding includes means for inverse orthogonally transforming each frame of video data.

23. The apparatus of claim 21, wherein each of said blocks of video data includes a block header including block position data and block data.

24. Apparatus for descrambling an intermittently scrambled or partially scrambled digital video signal, comprising:

means for receiving frames of video data, each frame having frame scramble-on or frame scramble-off data and respective blocks of video data, with each block having either block scramble-on or block scramble-off data;

means for descrambling each block having block scramble-on data in those frames having said frame scramble-on data to produce respective descrambled blocks of video data; and means for decoding said descrambled blocks of video data and each block not descrambled by said descrambling means.

25. The apparatus of claim 24, wherein the received frames of video data are comprised of a frame-limit coded frame followed by interframe coded frames.

26. The apparatus of claim 24, wherein each frame of video data includes a frame header and said respective blocks of video data, said frame header including a frame number, frame type data and scramble on/off data.

27. The apparatus of claim 26, wherein the received frames of video data are orthogonally transformed; and said means for decoding includes means for inverse orthogonally transforming each frame of video data.

28. The apparatus of claim 26, wherein each of said blocks of video data includes a block header including block position data and block data.

* * * * *